(12) United States Patent
Zhang et al.

(10) Patent No.: US 11,815,990 B2
(45) Date of Patent: Nov. 14, 2023

(54) METHOD FOR DETERMINING FAULTY COMPUTING CORE IN MULTI-CORE PROCESSOR AND ELECTRONIC DEVICE

(71) Applicant: HUAWEI TECHNOLOGIES CO., LTD., Shenzhen (CN)

(72) Inventors: Zhibin Zhang, Shenzhen (CN); Xiaobo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/761,683

(22) PCT Filed: Sep. 19, 2020

(86) PCT No.: PCT/CN2020/116343
§ 371 (c)(1),
(2) Date: Mar. 18, 2022

(87) PCT Pub. No.: WO2021/052489
PCT Pub. Date: Mar. 25, 2021

(65) Prior Publication Data
US 2022/0342739 A1    Oct. 27, 2022

(30) Foreign Application Priority Data
Sep. 19, 2019  (CN) .......................... 201910888839.6

(51) Int. Cl.
*G06F 11/07*   (2006.01)
*G06F 9/48*   (2006.01)

(52) U.S. Cl.
CPC .......... *G06F 11/079* (2013.01); *G06F 9/4881* (2013.01); *G06F 11/0724* (2013.01)

(58) Field of Classification Search
CPC ... G06F 11/079; G06F 11/0724; G06F 9/4881
See application file for complete search history.

(56) References Cited

U.S. PATENT DOCUMENTS 9,529,661 B1   12/2016  Miller et al.
2014/0089734 A1*   3/2014  Busaba ............... G06F 11/0724
                                                                  714/16

(Continued)

FOREIGN PATENT DOCUMENTS

CN   101681286 A   3/2010
CN   102629228 A   8/2012
(Continued)

OTHER PUBLICATIONS

"Series H: Audiovisual and Multimedia Systems, Infrastructure of audiovisual services—Coding of moving video, Advanced video coding for generic audiovisual services," ITU-T H.264, Total 836 pages, International Union of Telecommunication, Geneva, Switzerland (Jun. 2019).

(Continued)

*Primary Examiner* — Jigar P Patel
(74) *Attorney, Agent, or Firm* — Leydig, Voit & Mayer, Ltd.

(57) ABSTRACT

A method for determining a faulty computing core in a multi-core processor and an electronic device are provided. The method is applied to an electronic device configured with a multi-core processor. The multi-core processor is integrated with a plurality of computing cores, the plurality of computing cores are independent of each other, and the plurality of computing cores include a first computing core. The method includes: determining a computing core corresponding to each of N running exceptions, where the running exception is caused by an exception that occurs when any computing core in the plurality of computing cores executes the program instructions (301); and when a quantity of running exceptions corresponding to the first computing core in the N running exceptions is greater than or equal to M, determining that the first computing core is a faulty computing core, where M is a preset value (303).

20 Claims, 8 Drawing Sheets

(56) References Cited

U.S. PATENT DOCUMENTS

| | | | |
|---|---|---|---|
| 2016/0274996 | A1 | 9/2016 | Chen et al. |
| 2016/0378158 | A1 | 12/2016 | Allen-Ware et al. |
| 2018/0181474 | A1* | 6/2018 | DeHaemer .......... G06F 11/2028 |
| 2019/0243701 | A1 | 8/2019 | Kurts et al. |
| 2021/0064513 | A1* | 3/2021 | Chadha ............... G06F 11/3636 |

FOREIGN PATENT DOCUMENTS

| | | | |
|---|---|---|---|
| CN | 104137077 | A | 11/2014 |
| CN | 104199768 | A | 12/2014 |
| CN | 106407088 | A | 2/2017 |
| CN | 107908491 | A | 4/2018 |
| CN | 107977444 | A | 5/2018 |
| CN | 109298961 | A | 2/2019 |
| CN | 109685399 | A | 4/2019 |
| CN | 109783210 | A | 5/2019 |
| CN | 110221932 | A | 9/2019 |

OTHER PUBLICATIONS

"Series H: Audiovisual and Multimedia Systems, Infrastructure of audiovisual services—Coding of moving video, Advanced video coding for generic audiovisual services," ITU-T H.264, Total 836 pages, International Telecommunication Union, Geneva, Switzerland (Jun. 2019).

* cited by examiner

TABLE 1

| system exception core [AP], | reason [AP_S_PANIC:HI_APPANIC_RESERVED], | time [20190311055848-00000009], | sysreboot [true], | bootup_keypoint [70], | category [PANIC] |
|---|---|---|---|---|---|
| system exception core [AP], | reason [AP_S_PANIC:HI_APPANIC_RESERVED], | time [20190313055848-00000009], | sysreboot [true], | bootup_keypoint [70], | category [PANIC] |
| system exception core [AP], | reason [AP_S_PANIC:HI_APPANIC_RESERVED], | time [20190314055848-00000009], | sysreboot [true], | bootup_keypoint [70], | category [PANIC] |
| system exception core [AP], | reason [AP_S_PANIC:HI_APPANIC_RESERVED], | time [20190315055848-00000009], | sysreboot [true], | bootup_keypoint [70], | category [PANIC] |
| system exception core [AP], | reason [AP_S_PANIC:HI_APPANIC_RESERVED], | time [20190317055848-00000009], | sysreboot [true], | bootup_keypoint [70], | category [PANIC] |

TABLE 2

| Time [20190311055848], | Module [SoC_AP], | Error_ID [CPU_PANIC_INFO:925200002], | Log_Level [Critical], | Fault_Type [HW], | Data [cpu_num=3] |
|---|---|---|---|---|---|
| Time [20190313055848], | Module [SoC_AP], | Error_ID [CPU_PANIC_INFO:925200002], | Log_Level [Critical], | Fault_Type [HW], | Data [cpu_num=3] |
| Time [20190314055848], | Module [SoC_AP], | Error_ID [CPU_PANIC_INFO:925200002], | Log_Level [Critical], | Fault_Type [HW], | Data [cpu_num=3] |
| Time [20190315055848], | Module [SoC_AP], | Error_ID [CPU_PANIC_INFO:925200002], | Log_Level [Critical], | Fault_Type [HW], | Data [cpu_num=3] |
| Time [20190317055848], | Module [SoC_AP], | Error_ID [CPU_PANIC_INFO:925200002], | Log_Level [Critical], | Fault_Type [HW], | Data [cpu_num=3] |

FIG. 10

METHOD FOR DETERMINING FAULTY COMPUTING CORE IN MULTI-CORE PROCESSOR AND ELECTRONIC DEVICE

CROSS-REFERENCE TO RELATED APPLICATIONS

This application is a national stage of International Application No. PCT/CN2020/116343, filed on Sep. 19, 2020, which claims priority to Chinese Patent Application No. 201910888839.6, filed on Sep. 19, 2019. Both of the aforementioned applications are hereby incorporated by reference in their entireties.

TECHNICAL FIELD

This application relates to a technology for detecting a faulty component of an electronic device, and in particular, to a method for determining a faulty computing core in a multi-core processor and an electronic device.

BACKGROUND

According to statistics, a probability that a running exception such as an automatic restart occurs is about 300 per million. If 200 million mobile phones are shipped in a year, the running exception such as the automatic restart occurs on about 60,000 mobile phones.

Currently, a mobile phone generally uses a processor integrating 8 computing cores. Although the processor has a plurality of cores, if a reliability fault occurs on any core in the plurality of cores, a running exception such as an automatic restart may occur on the mobile phone. As a system-on-a-chip (SOC) manufacturing process of the mobile phone continuously evolves, an increasing quantity of computing cores are integrated into one processor. Correspondingly, for the mobile phone, a probability that a reliability fault of the computing core occurs is also increasing. This greatly affects user experience and increases a return repair rate and a return rate.

When a component such as a double data rate synchronous dynamic random access memory (DDR SDRAM) or a universal flash storage (UFS) of the mobile phone is faulty, the running exception such as the automatic restart also often occurs. Consequently, it is relatively difficult to detect a computing core fault. Currently, an authorized maintenance site of the mobile phone cannot detect the computing core fault, and the mobile phone needs to be returned to the factory for inspection. The return inspection requires assistance of special tools, repeated pressure tests, and manual analysis by professionals to locate causes of the running exception such as the automatic restart.

SUMMARY

Embodiments of this application provide a method for determining a faulty computing core and an electronic device, so as to automatically and quickly determine a specific faulty computing core.

According to a first aspect, an embodiment of this application provides a method for determining a faulty computing core in a multi-core processor, applied to an electronic device configured with a multi-core processor. The multi-core processor is integrated with a plurality of computing cores, the plurality of computing cores are independent of each other, and the plurality of computing cores include a first computing core. When the electronic device runs, at least one computing core in the plurality of computing cores executes program instructions. The program instructions are allocated based on a dynamic scheduling policy. The method includes: determining a computing core corresponding to each of N running exceptions, where the running exception is caused by an exception that occurs when any computing core in the plurality of computing cores executes the program instructions; and when a quantity of running exceptions corresponding to the first computing core in the N running exceptions is greater than or equal to M, determining that the first computing core is a faulty computing core, where M is a preset value.

With reference to the first aspect, in a first possible implementation of the first aspect, the multi-core processor is a central processing unit or a graphics processing unit.

In this implementation, a faulty central processing unit (CPU) core may be determined, or a faulty graphics processing unit (GPU) core may be determined.

With reference to the first aspect, in a second possible implementation of the first aspect, the dynamic scheduling policy is a completely fair scheduler.

In this implementation, the electronic device schedules the computing core in the multi-core processor based on the completely fair scheduler, so that accuracy of determining the faulty computing core can be improved.

With reference to the first aspect, in a third possible implementation of the first aspect, the running exceptions corresponding to the first computing core are consecutive running exceptions corresponding to the first computing core.

In this implementation, whether a computing core is a faulty core is determined by determining whether the computing core corresponds to a plurality of consecutive running exceptions, so that accuracy of determining the faulty computing core can be improved.

With reference to the first aspect, in a fourth possible implementation of the first aspect, the quantity of running exceptions corresponding to the first computing core is equal to N.

In this implementation, it is determined that a computing core is the faulty computing core by determining whether a plurality of times of running exceptions that have occurred on the electronic device correspond to the computing core, so that accuracy of determining the faulty computing core can be improved.

With reference to the first aspect, in a fifth possible implementation of the first aspect, the running exceptions corresponding to the first computing core are running exceptions corresponding to the first computing core that occur within preset duration.

In this implementation, the faulty computing core may be determined by using the running exceptions that occur within the preset duration. This can avoid impact of a running exception that occurs before a relatively long time on a result.

With reference to the first aspect, in a sixth possible implementation of the first aspect, the method further includes: shielding the first computing core.

In this implementation, after the faulty computing core is determined, the faulty computing core may be shielded. This can avoid abnormal running caused by running the program instructions on the faulty computing core, thereby improving user experience.

With reference to the first aspect, in a seventh possible implementation of the first aspect, the running exception is an unexpected restart of the electronic device.

In this implementation, the faulty computing core is determined by using a common running exception in running exceptions triggered by the faulty computing core, such as the unexpected restart, so that determining efficiency can be improved.

With reference to the first aspect, in an eighth possible implementation of the first aspect, the electronic device includes a first file and a second file, the first file records an occurrence time and an occurrence reason of each of the N running exceptions, and the second file records an identifier of the computing core and an occurrence time of the running exception. The determining a computing core corresponding to each of N running exceptions includes: determining the N running exceptions from the first file based on the occurrence reason of the running exception that is recorded in the first file; and determining, from the second file based on the occurrence time of the running exception recorded in the first file and the occurrence time of the running exception recorded in the second file, the computing core corresponding to each of the N running exceptions.

In this implementation, related information about the running exception is recorded by using the first file, and computing core information corresponding to the running exception is recorded by using the second file. The running exception may be associated with the computing core information by using the occurrence time of the running exception. This improves efficiency of determining the faulty computing core.

With reference to the first aspect, in a ninth possible implementation of the first aspect, information about the faulty computing core is recorded in a third file, and the third file may be invoked and/or sent to another electronic device.

In this implementation, the information about the faulty computing core may be recorded in a file, to facilitate invoking and sending to another device.

According to a second aspect, an embodiment of this application provides a method for determining a faulty computing core in a multi-core processor, applied to a first electronic device. The method includes: obtaining a log file of a second electronic device, where the second electronic device is an electronic device configured with a multi-core processor, the multi-core processor is integrated with a plurality of computing cores, the plurality of computing cores are independent of each other, and the plurality of computing cores include a first computing core; when the electronic device runs, at least one computing core in the plurality of computing cores executes program instructions, where the program instructions are allocated based on a dynamic scheduling policy; and the log file records N running exceptions of the second electronic device, where the running exception is caused by an exception that occurs when any computing core in the plurality of computing cores executes the program instructions; determining a computing core corresponding to each of the N running exceptions; and when a quantity of running exceptions corresponding to the first computing core in the N running exceptions is greater than or equal to M, determining that the first computing core is a faulty computing core, where M is a preset value.

In this solution, the electronic device may obtain a log file of another electronic device, and determine a faulty computing core of the another electronic device based on a running exception recorded in the log file.

With reference to the second aspect, in a first possible implementation of the second aspect, the multi-core processor is a central processing unit or a graphics processing unit.

With reference to the second aspect, in a second possible implementation of the second aspect, the dynamic scheduling policy is a completely fair scheduler.

With reference to the second aspect, in a third possible implementation of the second aspect, the running exceptions corresponding to the first computing core are consecutive running exceptions corresponding to the first computing core.

With reference to the second aspect, in a fourth possible implementation of the second aspect, the quantity of running exceptions corresponding to the first computing core is equal to N.

With reference to the second aspect, in a fifth possible implementation of the second aspect, the running exceptions corresponding to the first computing core are running exceptions corresponding to the first computing core that occur within preset duration.

With reference to the second aspect, in a sixth possible implementation of the second aspect, the method further includes: sending identification information of the first computing core to the second electronic device, so that the second electronic device shields the first computing core.

With reference to the second aspect, in a seventh possible implementation of the second aspect, the running exception is an unexpected restart of the second electronic device.

With reference to the second aspect, in an eighth possible implementation of the second aspect, the log file includes a first file and a second file, the first file records an occurrence time and an occurrence reason of each of the N running exceptions, and the second file records an identifier of the computing core and an occurrence time of the running exception.

The determining a computing core corresponding to each of the N running exceptions includes:

determining the N running exceptions from the first file based on the occurrence reason of the running exception that is recorded in the first file; and determining, from the second file based on the occurrence time of the running exception recorded in the first file and the occurrence time of the running exception recorded in the second file, the computing core corresponding to each of the N running exceptions.

According to a third aspect, an embodiment of this application provides an apparatus for determining a faulty computing core in a multi-core processor. The apparatus is disposed in an electronic device configured with a multi-core processor, the multi-core processor is integrated with a plurality of computing cores, the plurality of computing cores are independent of each other, and the plurality of computing cores include a first computing core. When the electronic device runs, at least one computing core in the plurality of computing cores executes program instructions. The program instructions are allocated based on a dynamic scheduling policy. The apparatus includes:

a first determining unit, configured to determine a computing core corresponding to each of N running exceptions, where the running exception is caused by an exception that occurs when any computing core in the plurality of computing cores executes the program instructions; and a second determining unit, configured to: when a quantity of running exceptions corresponding to the first computing core in the N running exceptions is greater than or equal to M, determine that the first computing core is a faulty computing core, where M is a preset value.

According to a fourth aspect, an embodiment of this application provides an apparatus for determining a faulty computing core in a multi-core processor. The apparatus is disposed in a first electronic device; and the apparatus includes:

an obtaining unit, configured to obtain a log file of a second electronic device, where the second electronic device is an electronic device configured with a multi-core processor, the multi-core processor is integrated with a plurality of computing cores, the plurality of computing cores are independent of each other, and the plurality of computing cores include a first computing core; when the electronic device runs, at least one computing core in the plurality of computing cores executes program instructions, where the program instructions are allocated based on a dynamic scheduling policy; and the log file records N running exceptions of the second electronic device, where the running exceptions are caused by an exception that occurs when any computing core in the plurality of computing cores executes the program instructions;

a first determining unit, configured to determine a computing core corresponding to each of the N running exceptions; and a second determining unit, configured to: when a quantity of running exceptions corresponding to the first computing core in the N running exceptions is greater than or equal to M, determine that the first computing core is a faulty computing core, where M is a preset value.

According to a fifth aspect, an embodiment of this application provides an electronic device, including at least one processor and a memory. The at least one processor includes a multi-core processor, the multi-core processor is integrated with a plurality of computing cores, the plurality of computing cores are independent of each other, and the plurality of computing cores include a first computing core. When the electronic device runs, at least one computing core in the plurality of computing cores executes program instructions. The program instructions are allocated based on a dynamic scheduling policy.

The memory is configured to store computer-executable instructions, and when the electronic device runs, the at least one processor executes the computer-executable instructions stored in the memory, to enable the electronic device to perform the method according to the first aspect.

According to a sixth aspect, an embodiment of this application provides an electronic device, including a processor, a memory, and a transceiver. The memory is configured to store computer-executable instructions, and when the electronic device runs, the processor executes the computer-executable instructions stored in the memory, to enable the electronic device to perform the method according to the second aspect.

According to a seventh aspect, an embodiment of this application provides a computer storage medium. The computer storage medium includes computer instructions. When the computer instructions are run on an electronic device, the electronic device is enabled to perform the method according to the first aspect or the method according to the second aspect.

According to an eighth aspect, an embodiment of this application provides a computer program product. When program code included in the computer program product is executed by a processor in an electronic device, the method according to the first aspect or the method according to the second aspect is performed.

According to the method for determining a faulty computing core in a multi-core processor provided in the embodiments of this application, when a plurality of running exceptions related to an exception that occurs when a computing core in the multi-core processor executes the program instructions occur on an electronic device, a computing core corresponding to the running exception may be analyzed. If computing cores corresponding to a preset quantity of running exceptions in the plurality of running exceptions are a same computing core, it may be determined that the computing core is a faulty computing core. In this way, the faulty computing core is automatically and quickly determined without a professional or a special test.

BRIEF DESCRIPTION OF DRAWINGS

FIG. 10 includes Table 1 and Table 2 according to an embodiment of this application.

DESCRIPTION OF EMBODIMENTS

Figure 1:
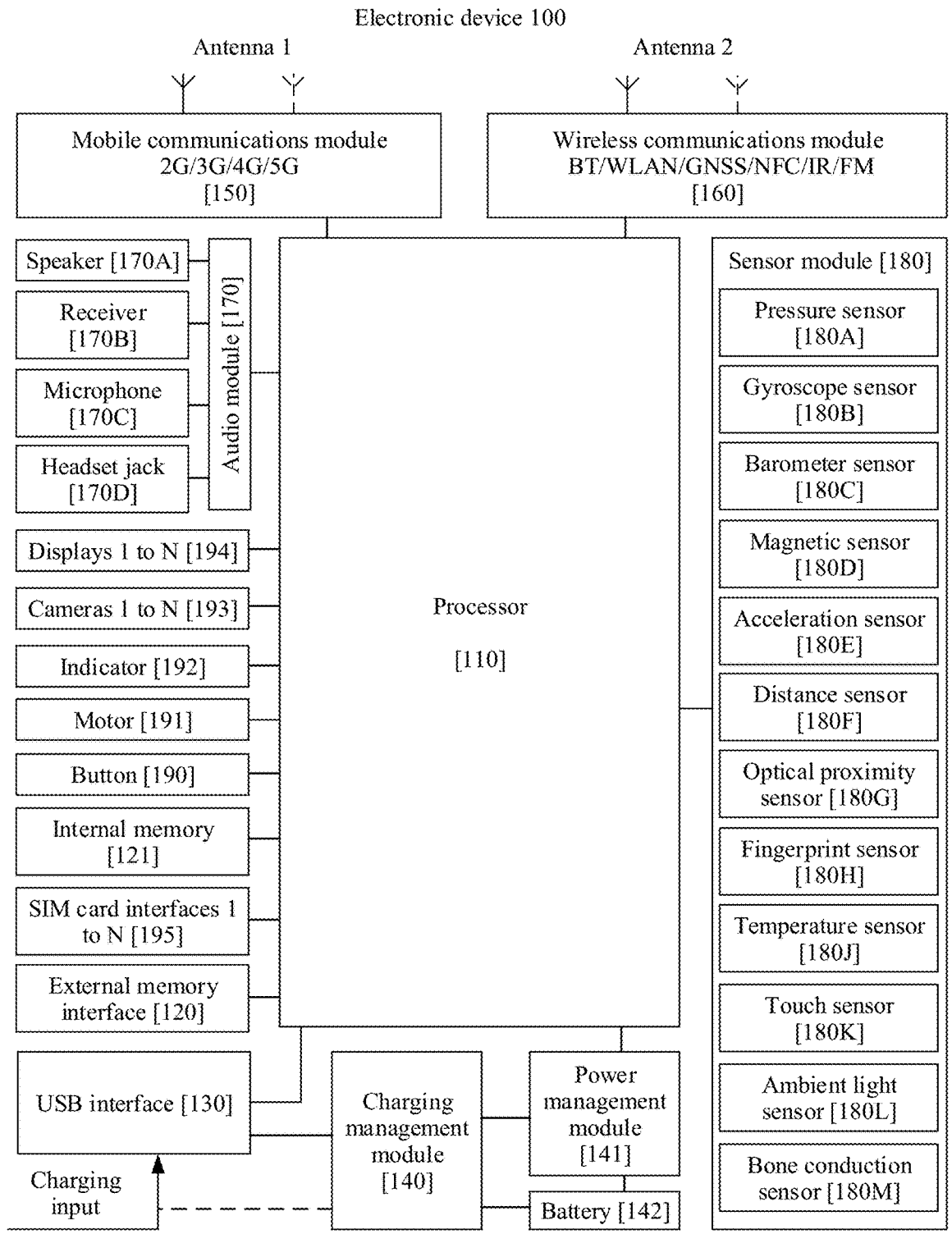
FIG. 1 is a schematic diagram of a hardware structure of an electronic device according to an embodiment of this application.

The following describes embodiments of this application with reference to the accompanying drawings. It is clearly that the described embodiments are merely some but not all of the embodiments of this application.

In the description of this specification, "an embodiment", "some embodiments", or the like indicates that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized.

In the description of this specification, "/" means "or" unless otherwise specified. For example, A/B may represent A or B. In this specification, "and/or" describes only an association relationship between associated objects and represents that three relationships may exist. For example, A and/or B may represent the following three cases: only A exists, both A and B exist, and only B exists. In addition, in the descriptions in the embodiments of this application, "a plurality of" means two or more.

The terms "first" and "second" in the description of this specification are merely intended for a purpose of description, and shall not be understood as an indication or implication of relative importance or implicit indication of a quantity of indicated technical features. Therefore, a feature limited by "first" or "second" may explicitly or implicitly include one or more features. The terms "include", "contain", "have", and their variants all mean "include but are not limited to", unless otherwise specifically emphasized.

An embodiment of this application provides a method for determining a faulty computing core in a multi-core processor. When a plurality of running exceptions related to an exception that occurs when a computing core in the multi-core processor executes the program instructions occur on an electronic device, a computing core corresponding to the running exception is analyzed. If computing cores corresponding to a preset quantity of running exceptions in the plurality of running exceptions are a same computing core, it may be determined that the computing core is a faulty computing core. In this embodiment of this application, the faulty computing core means that the computing core has a fault.

The method for determining a faulty computing core in a multi-core processor provided in this embodiment of this application may be applied to an electronic device configured with a multi-core processor. The electronic device may be a portable electronic device such as a mobile phone, a tablet computer, a digital camera, a personal digital assistant (PDA), a wearable device, or a laptop. An example embodiment of the portable electronic device includes but is not limited to a portable electronic device using iOS, Android, Microsoft, or another operating system. The portable electronic device may alternatively be another portable electronic device, for example, a laptop with a touch-sensitive surface (for example, a touch panel). It should be further understood that, in some other embodiments of this application, the electronic device may alternatively be a desktop computer with a touch-sensitive surface (for example, a touch panel), but not a portable electronic device. A type of the electronic device is not specifically limited in this embodiment of this application.

FIG. 1 is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by hardware, software, or a combination of software and hardware.

The processor 110 may include a central processing unit (CPU). The CPU may be integrated with a plurality of computing cores, and cores of the plurality of computing cores may be independent of each other. When the electronic device runs, program instructions may be allocated to one or more computing cores of the CPU for execution.

The processor 110 may further include a graphics processing unit (GPU). The GPU may be integrated with a plurality of computing cores, and cores of the plurality of computing cores may be independent of each other. When performing graphics processing, the electronic device may allocate program instructions related to graphics processing to one or more computing cores of the GPU for execution.

The processor 110 may further be a modem processor, an image signal processor (ISP), a controller, a video codec, a digital signal processor (DSP), a baseband processor, a neural-network processing unit (NPU), and/or the like.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be used to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset to play audio by using the headset. Alternatively, the interface may be configured to connect to another electronic device, for example, an AR device.

It may be understood that an interface connection relationship between the modules illustrated in this embodiment of this application is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the central processing unit. The central processing unit outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), a fifth generation, new radio (NR), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the central processing unit, and the like. The GPU is a microprocessor for image processing, and is connected to the display 194 and the central processing unit. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

In some embodiments of this application, when the display panel is made of a material such as the OLED, the AMOLED, or the FLED, the display 194 may be folded. In other words, the electronic device 100 may be provided with a foldable display. Herein, that the display 194 may be folded means that the display may be folded to any angle at a fixed part or any part and may be maintained at the angle. The foldable display has two states: an unfolded state and a folded state. When a folding angle formed when the foldable display is folded is greater than a preset value, it may be considered that the foldable display is in the unfolded state; or when a folding angle formed when the foldable display is folded is less than a preset value, it may be considered that the foldable display is in the folded state. The folding angle may be an angle formed at a bent part by a side of the foldable display that is not used to display content. The preset value may be predefined, for example, may be 90 degrees or 80 degrees. In some embodiments, an angle sensor may be disposed at a folding position of the foldable display, and the electronic device may detect the folding angle by using the angle sensor, and determines, based on the folding angle, whether the foldable display is in the unfolded state or the folded state.

When the foldable display is in the unfolded state, a user interface provided by an operating system of the electronic device may be displayed in full screen. The full-screen display of the user interface may mean that the user interface occupies all display areas of the foldable display, or may mean that the user interface occupies most display areas of the display. For example, when the foldable display is a notch screen, a middle part of the notch screen displays the user interface. When a black screen occurs on one side or both sides of the display, it may also be considered that the foldable display displays the user interface in full screen.

When the foldable display is in the folded state, the electronic device may display, on only one display of the foldable display, the user interface provided by the operating system, or may display, on both displays of the foldable display, the user interface provided by the operating system of the electronic device. This is not limited in this embodiment of this application.

In some embodiments, when the foldable display changes from the unfolded state to the folded state, the electronic device may change from displaying the user interface on the foldable display in full screen to displaying the user interface on one display of the foldable display.

In some other embodiments of this application, the electronic device 100 may be provided with two independent displays, and the two displays are located on two sides of the electronic device 100 respectively. When the electronic device 100 is provided with two displays, the two displays may have a same configuration, or may have different configurations. For example, the two displays may be made of the same or different materials, and may have a same screen size or different screen sizes, for example, one display is a 6-inch OLED screen, and the other display is a 3.3-inch LCD screen. This is not limited in this embodiment of this application.

The electronic device 100 may implement a photographing function by using the ISP, the camera 193, the video codec, the GPU, the display 194, the central processing unit, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 100. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications and data processing of the electronic device 100.

The electronic device 100 may implement audio functions, for example, music playing and recording, by using the audio module 170, the speaker 170A, the receiver 170B, the microphone 170C, the headset jack 170D, the central processing unit, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating a new SMS message is executed. In some embodiments, the pressure sensor 180A may detect a detection signal indicating that a finger of the user touches the display 194, to determine a contact area and a contact zone in which the finger touches the display 194, and further determine whether the finger is sandwiched by the electronic device 100 in a folded form.

The gyroscope sensor 180B may be configured to determine a motion posture of the electronic device 100. In some embodiments, an angular velocity of the electronic device 100 around three axes (that is, axes x, y, and z) may be determined by using the gyroscope sensor 180B. The gyroscope sensor 180B may be configured to perform image stabilization during photographing. For example, when a shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the central processing unit, to determine a type of a touch event. A visual output related to the touch operation may be provided on the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The central processing unit may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 is also compatible to an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, an Android system of a layered architecture is used as an example to describe a software structure of the electronic device 100.

Figure 2:
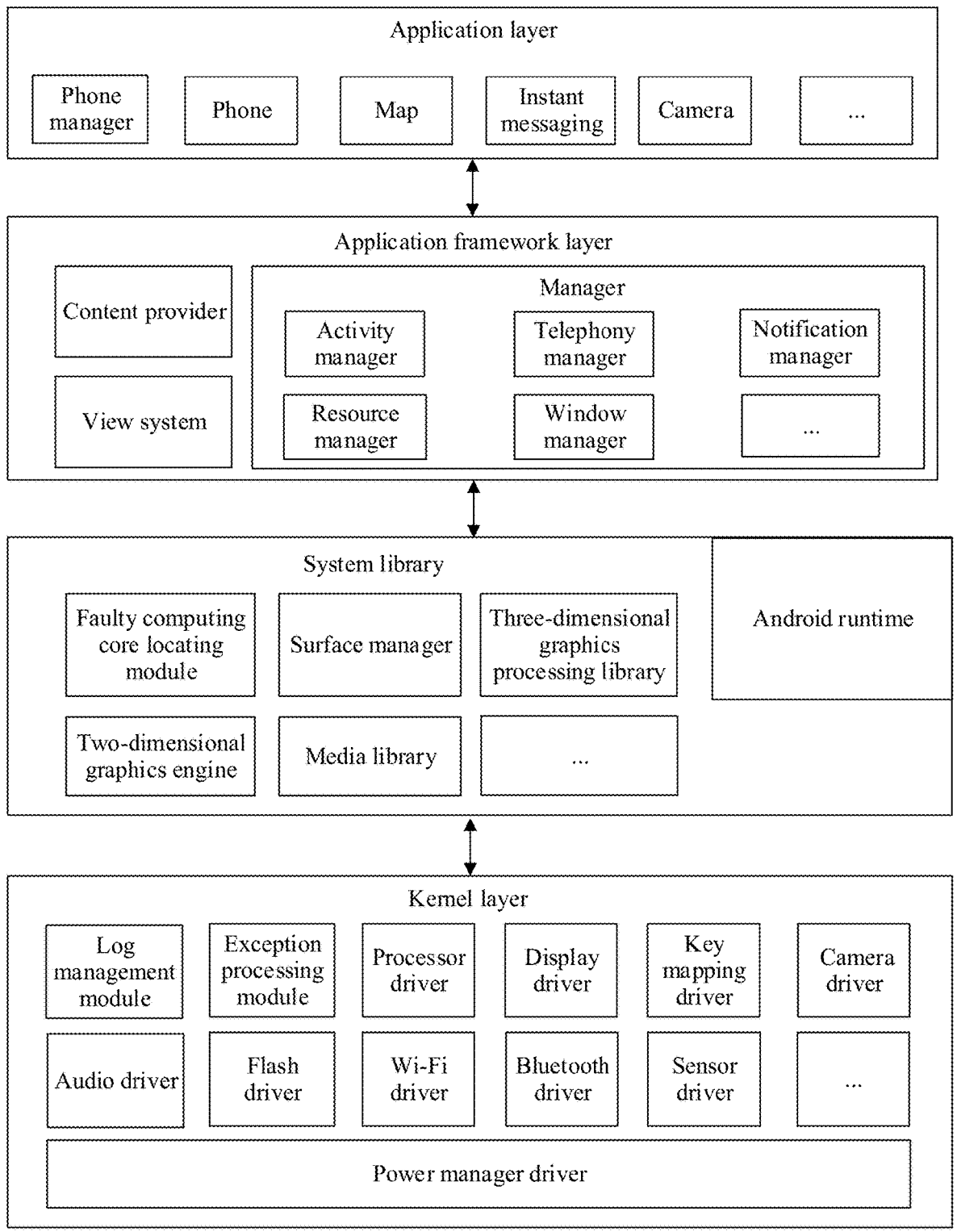
FIG. 2 is a block diagram of a software structure of an electronic device according to an embodiment of this application.

FIG. 2 is a block diagram of the software structure of the electronic device 100 in this embodiment of this application.

In the layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom.

The application layer may include a series of application packages.

As shown in FIG. 2, the application package may include applications such as Phone manager, Phone, Map, Instant messaging, and Camera.

The application framework layer provides an application programming interface (API) and a programming framework for an application at the application layer. The application framework layer includes some predefined functions.

As shown in FIG. 2, the application framework layer may include a content provider, a view system, and managers. The managers include an activity manager, a telephony manager, a notification manager, a resource manager, a window manager, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The activity manager is configured to manage a life cycle of an application and manage an activity stack.

The telephony manager is configured to provide a communication function of the electronic device 100, for example, management of a call status (including answering, declining, and the like).

The notification manager enables an application to display notification information in a status bar, and may be configured to convey a notification type message, where the displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted for in the status bar, an announcement is produced, the electronic device vibrates, or an indicator light blinks.

The resource manager provides various resources for an application, such as a localized character string, an icon, a picture, a layout file, and a video file.

The window manager is configured to manage a window program. The window manager may obtain a size of a display, determine whether there is a status bar, perform screen locking, take a screenshot, and the like.

Window manager, Content provider, View system, Phone manager, Resource manager, Notification manager, and the like.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system database may include a faulty computing core locating module and other function modules. The other function modules may include a surface manager, a media library, a three-dimensional graphics processing library (for example, OpenGL ES), a two-dimensional graphics engine (for example, SGL), and the like.

The faulty computing core locating module may determine, based on information about abnormal running that is recorded at the kernel layer each time and information about a computing core corresponding to a running exception that is recorded at the kernel layer each time, information about a computing core corresponding to each abnormal running. The computing core may be a computing core of a multi-core CPU or a multi-core GPU. When a quantity of running exceptions corresponding to any computing core in the multi-core CPU or the multi-core GPU meets a preset rule, it may be determined that the computing core is a faulty computing core.

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a log management module, an exception processing module, a processor driver, a display driver, a key mapping driver, a camera driver, an audio driver, a flash driver, a Wi-Fi driver, a Bluetooth driver, a sensor driver, a power manager driver, and the like.

The following describes an example of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is started. Then, a camera driver is started by invoking the kernel layer, and a static image or a video is captured by using the camera 193.

The exception processing module at the kernel layer may record information about a running exception in a file A, and the running exception may include the running exception at the kernel layer. The information about the running exception may include information such as an occurrence time and an occurrence reason of the running exception. In an example, the exception processing module may invoke an oops function to record the information about the running exception in the file A. The log management module may record, in a file B, information about a computing core corresponding to the running exception, for example, the occurrence time of the running exception and an identifier of the computing core. In an example, the log management module may invoke a printk function to record the information about the computing core in the file B. The faulty computing core locating module in the system library may read the information recorded in the file A and the file B. A preset-type running exception (for example, a panic restart) and a time of the running exception are filtered out from the file A. Then, core information corresponding to the running exception is determined from the file B based on the time of the running exception. If computing cores corresponding to a first quantity of running exceptions in a plurality of consecutive times of preset-type running exceptions are a same computing core, it may be determined that the computing core is a faulty computing core (the computing core is faulty). The faulty computing core locating module may record information about the faulty computing core in a file C. The file C may be accessed by an application at the application layer, and may be sent to another electronic device (for example, a data center of a device manufacturer).

Figure 3:
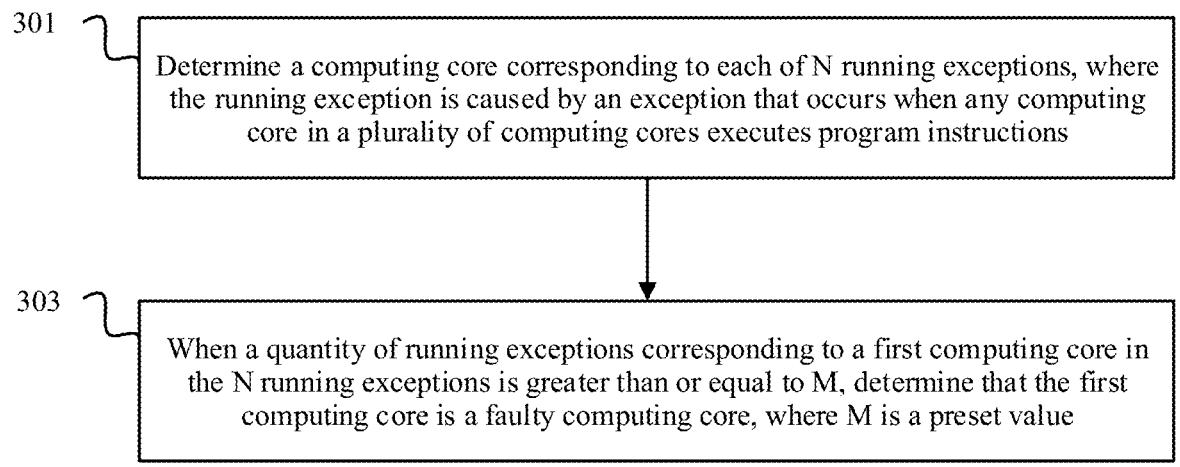
FIG. 3 is a flowchart of a method for determining a faulty computing core in a multi-core processor according to an embodiment of this application.

The following uses an example to describe, with reference to FIG. 3, a method for determining a faulty computing core a multi-core processor according to an embodiment of this application. The method may be applied to an electronic device configured with a multi-core processor. The multi-core processor may be integrated with a plurality of computing cores. The computing core may also be referred to as a processing core. The plurality of computing cores are independent of each other, and may execute program instructions in parallel. When the electronic device runs, the electronic device may allocate, by using a dynamic scheduling policy, program instructions that need to be executed to at least one of the plurality of computing cores for execution.

The dynamic scheduling policy may also be referred to as a non-static allocation policy, and is a scheduling policy that prevents one or more processes from always running on a computing core in the multi-core processor.

In some embodiments, the dynamic scheduling policy may be a kernel layer-based multi-core processor load balancing scheduling algorithm. Specifically, the kernel layer-based multi-core processor load balancing scheduling algorithm may be a completely fair scheduler (CFS). The kernel layer of the electronic device may allocate, based on the completely fair scheduler, the program instructions that need to be executed to one or more of the plurality of computing cores, so that random allocation may be implemented, and a probability that each of the plurality of computing cores is allocated with the program instructions is equal or approximately equal.

In some embodiments, the dynamic scheduling policy may be a polling policy.

In some embodiments, the multi-core processor may be a multi-core CPU. Correspondingly, the computing core is a CPU core, and may also be referred to as a CPU core or a CPU processing core.

In some embodiments, the multi-core processor may be a multi-core GPU. Correspondingly, the computing core is a GPU core, and may also be referred to as a GPU core or a GPU processing core.

As shown in FIG. 3, the method further includes the following steps.

Step 301: determine a computing core corresponding to each of N running exceptions, where the running exception is caused by an exception that occurs when any computing core in the plurality of computing cores executes the program instructions.

N may be a preset integer, for example, 3, 5, or 10.

Generally, the exception that occurs when the computing core executes the program instructions may include the following cases:

A fault of the computing core may cause an exception when the computing core executes the program instructions.

The program instructions have a bug. When the program instructions are executed by the computing core, an exception may occur.

A storage area (for example, a DDR partition) that stores data or instructions is faulty. When the computing core executes the program instructions and invokes the data or instructions stored in the faulty storage area, an exception may occur.

The exception that occurs when the computing core executes the program instructions may cause a running exception of the electronic device. Generally, the running exception may be specifically an unexpected restart, a black screen, a frozen screen, or the like. The unexpected restart is the most common.

In some embodiments, the unexpected restart of the electronic device caused by the exception that occurs when the computing core executes the program instructions may be referred to as a panic restart.

In addition, an exception of a camera of the electronic device, an exception of a microphone, an exception of current or voltage of a battery, or the like may also cause abnormal running of the electronic device, for example, the unexpected restart.

The electronic device may record related information about the running exception that occurs, and the information includes an occurrence time and an occurrence reason of the running exception. The electronic device may further record information about a component corresponding to the running exception. For example, if the running exception is caused by the exception that occurs when the computing core executes the program instructions, the electronic device may record information about the computing core.

In some embodiments, the occurrence time may be a time when the running exception occurs. For example, the running exception is the unexpected restart, and if an exception occurs when the computing core executes the program instructions, the kernel layer may invoke a system restart process to perform a restart. Before the restart is performed, the kernel layer may invoke an oops function to record an occurrence reason of the restart and an occurrence time of the restart in a file A, and save the file A. The file A may be a text file.

The electronic device may record, in a file B, the occurrence time of the running exception and the information about the component corresponding to the running exception, and store the file B. The information about the component may be specifically an identifier of the component. The file B may be a text file.

In an example, the running exception is the unexpected restart, and if an exception occurs when the computing core executes the program instructions, the kernel layer may invoke the system restart process to perform a restart. The kernel layer may record, in the file B, information such as an identifier of a computing core corresponding to the unexpected restart and the occurrence time of the unexpected restart. In an example, the kernel layer may invoke a printk function to record, in the file B, information such as an identifier of a component corresponding to the unexpected restart and the occurrence time of the unexpected restart.

In an example, if the reason of the running exception is the exception of the camera, the exception of the microphone, the exception of the current or voltage of the battery, or the like, the information about the component corresponding to the running exception recorded in the file B may include information about the component (the camera, the microphone, the battery, or the like) on which the exception occurs and the information about the computing core that is executing the program instructions when the exception occurs.

In an illustrative example of these embodiments, the file A and the file B may be different files. The file A may record related information about at least one running exception. Related information about each running exception may include information such as an occurrence reason and an occurrence time of the running exception. The file B may record an occurrence time of the at least one running exception and information about a component corresponding to the at least one running exception. Information about a component corresponding to each running exception may include an identifier of the component, for example, a number of a computing core.

In a specific example, in FIG. 10, at least a part of data record formats of the file A may be shown in Table 1, and at least a part of data record formats of the file B may be shown in Table 2.

In Table 1, reason indicates the reason of the running exception, and time indicates the occurrence time of the running exception. AP in the reason is short for application processor. The application processor may also be referred to as a CPU. The reason may indicate that the reason of the running exception is that an exception occurs when the application processor or a computing core of the CPU executes the program instructions.

In Table 2, time is an occurrence time of a running restart, data is a number of a computing core in a multi-core CPU, and the number may be used as an identifier of the computing core.

In some embodiments, the file A may be a group of files, and each group of files records related information about a running exception. The group of files corresponding to the file A can be compressed.

The file B may be a group of files, and each group of files records an occurrence time of a running exception and information about a component corresponding to the running exception. The group of files corresponding to the file B can be compressed.

In some embodiments, the file A or the file B may also be data or a log or a record in another form.

In some embodiments, the occurrence time may be an occurrence time of the reason that causes the running exception. The reason of the running exception may be specifically the exception occurring when the computing core executes the program instructions, the exception occurring in the camera, the exception occurring in the microphone, the exception occurring in the current or voltage of the battery, or the like. When the reason of the running exception occurs, the kernel layer may invoke the oops function to record the reason of the running exception and the occurrence time of the reason in a file a, and save the file a. For the file a, refer to the foregoing description of the file A, and details are not described herein again.

The electronic device may record, in a file b, the occurrence time of the reason of the running exception and the information about the component corresponding to the running exception. The kernel layer may record, in the file b, information such as an identifier of the component corresponding to the running exception and the occurrence time of the reason of the running exception, and store the file b. For the file b, refer to the foregoing description of the file B.

In an example, if the reason of the running exception is the exception of the camera, the exception of the microphone, the exception of the current or voltage of the battery, or the like, the information about the component corresponding to the running exception recorded in the file b may include information about the component (the camera, the microphone, the battery, or the like) on which the exception occurs and the information about the computing core that is executing the program instructions when the exception occurs.

In step 301, the electronic device may determine, based on the reason of the running exception, a plurality of running exceptions caused by the exception that occurs when the computing core executes the program instructions, and determine a computing core corresponding to each of the plurality of running exceptions.

In some embodiments, step 301 may be performed after the running exception ends. The unexpected restart is used as an example. Step 301 may be performed after the electronic device completes a restart.

In some embodiments, the plurality of running exceptions caused by the exception that occurs when the computing core executes the program instructions may be determined from the file A based on the reason of the running exception. Then, the computing core corresponding to each of the plurality of running exceptions is determined from the file B based on the occurrence time of the running exception. For any of the plurality of running exceptions, an occurrence time of the running exception is recorded in both the file A and the file B, and the file B records information about the computing core. Therefore, the computing core corresponding to the running exception may be determined based on the occurrence time of the running exception.

In some embodiments, the plurality of running exceptions caused by the exception that occurs when the computing core executes the program instructions may be determined from the file a based on the reason of the running exception. Then, the computing core corresponding to each of the plurality of running exceptions is determined from the file b based on the occurrence time of the running exception. For any of the plurality of running exceptions, an occurrence time of the reason of the running exception is recorded in both the file a and the file b, and the file b records information about the computing core. Therefore, the computing core corresponding to the running exception may be determined based on the occurrence time of the reason of the running exception.

In some embodiments, the determined plurality of running exceptions caused by the exception that occurs when the computing core executes the program instructions may be consecutive running exceptions. The unexpected restart is used as an example, and determined plurality of unexpected restarts are consecutive unexpected restarts.

In some embodiments, the determined plurality of running exceptions caused by the exception that occurs when the computing core executes the program instructions may be running exceptions that occur within preset duration. The preset duration may be duration in which a preset period is calculated forward in a time dimension starting from a current moment, for example, the latest 7 days, 10 days, or 3 days.

Step 303: when a quantity of running exceptions corresponding to a first computing core in the N running exceptions is greater than or equal to M, determine that the first computing core is a faulty computing core, where M is a preset value.

It is easy to understand that the kernel layer allocates program instructions to each computing core in the multi-core processor based on the dynamic scheduling policy. A program instruction does not always run on a computing core, and data or instructions in one or more partitions of a memory such as a DDR is not always invoked by a computing core. If more or all of the N running exceptions are caused by an exception that occurs when the first computing core runs the program instructions, it may be indicated or reflected that the occurring exception is caused by a fault of the first computing core with a high probability.

M may be an integer preset based on a value of N. M may be less than or equal to N. For example, N is 3, and M may be 3. For another example, N is 5, and M may be 4. For another example, N is 10, and M may be 8. Other examples are not enumerated one by one herein. A developer can set values of N and M based on related counters. For example, to reduce a false positive rate, N and M may be set to higher values. For another example, to quickly determine the faulty computing core, N and M may be set to lower values.

In some embodiments, the running exceptions corresponding to the first computing core may be consecutive running exceptions corresponding to the first computing core.

In an illustrative example of these embodiments, M may be set to 2. A processor integrating 8 computing cores is used as an example. In the dynamic scheduling policy, a probability that a program instruction with a vulnerability is run by any one of the 8 computing cores for two consecutive times is $$\left(\frac{1}{8^2}\right) \times 8 = \frac{1}{8}.$$

Alternatively, a probability that data or instructions in one or more faulty partitions of the memory such as the DDR is invoked by any one of the 8 computing cores is 1/8. Therefore, if the running exceptions that occur consecutively for at least twice correspond to the first computing core, a false positive rate of determining the first computing core as the faulty computing core is not greater than 1/8, that is, the false positive rate is not greater than 12.5%.

In an illustrative example of these embodiments, M may be set to 3. The processor integrating 8 computing cores is still used as an example. In the dynamic scheduling policy, the false positive rate is not greater than $$\frac{1}{8^2},$$

the false positive rate is not greater than 1.6%.

In some embodiments, the quantity of running exceptions corresponding to the first computing core is equal to N.

In an illustrative example of these embodiments, N may be set to 3, so that the false positive rate is not greater than 1.6%.

In an actual experiment, according to the setting of this example, accuracy of determining a faulty core is more than 95%.

In some embodiments, N>M, and the quantity of running exceptions corresponding to the first computing core is M.

In an illustrative example of these embodiments, N may be set to 10, and M may be set to 9. The processor integrating 8 computing cores is still used as an example. The false positive rate is close to 0.

In some embodiments, the running exceptions corresponding to the first computing core are running exceptions corresponding to the first computing core that occur within preset duration.

The preset duration may be duration in which a preset period is calculated forward in a time dimension starting from a current moment, for example, the latest 7 days, 10 days, or 3 days. This avoids interference of a running exception that occurs before a relatively long time.

In some embodiments, step 303 may be replaced by some equivalent determining methods.

In an illustrative example, the equivalent determining method that may replace step 303 may be: in a plurality of times of running exceptions that occur within the preset duration, a quantity of exceptions corresponding to the first computing core is greater than or equal to K. The preset duration may be duration in which a preset period is calculated forward in a time dimension starting from a current moment (for example, the latest 7 days, 10 days, or 3 days). K is a preset value (for example, may be 3, 5, or 6).

In an illustrative example, the equivalent determining method that may replace step 303 may be: in a plurality of times of running exceptions that occur within the preset duration, a proportion of exceptions corresponding to the first computing core is greater than or equal to Z %. The preset duration may be duration in which a preset period is calculated forward in a time dimension starting from a current moment (for example, the latest 7 days, 10 days, or 3 days). Z % is a preset value (for example, may be 70%, 80%, or 90%).

In some embodiments, when the faulty computing core is determined, the faulty computing core may be shielded, so that the kernel layer may ignore the faulty computing core when allocating the program instructions, thereby avoiding the running exception caused by the faulty computing core.

In an illustrative example, a processor driver at the kernel layer may be invoked to prohibit or disable the faulty computing core by using an echo command. Prohibiting or disabling the faulty computing core may be referred to as shielding the faulty computing core. In a specific example, the echo command may be echo 0>/sys/devices/system/cpu/cpu3/online. cpu3 indicates a CPU core numbered 3.

In some embodiments, when the faulty computing core is determined, information about the faulty computing core, for example, an identifier of the computing core, may be recorded in a file C, and the file C is stored. For the file C, refer to the foregoing description of the file A, and details are not described herein again.

In an illustrative example, an application at the application layer, for example, Phone manager, may read the file C through an API interface, to read information about the faulty computing core. The application reads the information about the faulty computing core, and may display the faulty computing core, so that a user or maintenance personnel can know the faulty computing core.

In an example of this example, each time the file C records the information about the faulty computing core, an application at the application layer may be notified, so that the application performs reading.

In an illustrative example, the electronic device may further send the file C to another electronic device, for example, to a data center server of a device vendor, so that the device vendor performs related statistics. In a specific example, the sending the file C to another electronic device may be an operation performed in response to an operation initiated by the user, that is, the user may actively send the file C to the another electronic device. In a specific example, the electronic device may request authorization from the user, and send the file C to the another electronic device when obtaining the authorization from the user. Specifically, the electronic device may display authorization request information on a display. The authorization request information includes risk prompt information, a rejection function option, and a consent function option. After detecting that the user taps or touches the consent function option, the file C may be sent to the another electronic device.

In an illustrative example, each time the file C records the information about the faulty computing core, the data center server of the device vendor may be notified, so that the data center server reads the information about the faulty computing core in the file C.

In some embodiments, the method in FIG. 3 may be specifically executed by a faulty computing core locating module in a system library (which may also be referred to as a native (native) layer).

In an illustrative example, the faulty computing core locating module may be an application at the native layer. The faulty computing core locating module may be written in C or C++. The faulty computing core locating module may read the file A, and determine a running exception caused by an exception that occurs when the computing core executes the program instructions, and an occurrence time of the running exception. The faulty computing core locating module may further read the occurrence time of the running exception and CPU core information corresponding to the running exception that are recorded in the file B. The faulty computing core locating module may determine, by using an occurrence time of any running exception, CPU core information corresponding to the running exception. Therefore, a CPU core corresponding to each running exception may be determined.

The kernel layer may include a log management module, an exception processing oops function, a CPU driver, or the like.

The exception processing function oops may record the unexpected restart of the electronic device in the file A, and the log management module invokes the printk function to record the CPU core information (including a CPU core identifier) corresponding to the unexpected restart in the file B. A format of the file A is shown in Table 1, and key information is reason and time. A format of the file B is shown in Table 2, and key information is Time and Data.

In a specific example: (1) When software code of the electronic device runs to a faulty CPU core, an exception occurs, data/an instruction address accessed by the software code is invalid, the exception processing oops function is triggered to record an unexpected restart event to the file A, and the log management module is triggered to invoke the printk function to record core information corresponding to the unexpected restart event and an occurrence event to the file B. Then, the kernel layer invokes the system restart process to actively restart the electronic device. After a first unexpected system restart occurs, the faulty computing core locating module collects the unexpected restart event by reading the file A, records an occurrence time of the unexpected restart event, and reads, based on the occurrence time of the unexpected restart event, an identifier of the CPU core recorded in the file B, for example, the identifier of the CPU core may be a number, and more specifically, may be a number 3.

(2) Step 2 is repeated until a third unexpected restart occurs. Then, the faulty computing core locating module calculates that an interval between the third unexpected restart and the first unexpected restart is within 7 days, and after the third unexpected restart occurs, if a CPU core number recorded in the file B is 3, which is the same as that recorded in the previous two times, it is determined that the CPU core numbered 3 is faulty, a result is written into the file C, and an application at a Java layer or a database of a big data website is notified to read the result. The application at the Java layer may be a system management application provided by a third party such as Phone manager. The big data website may be a data center of the device vendor. When receiving a read request sent by the database of the big data website, the electronic device may request authorization from the user, and after obtaining the authorization from the user, the electronic device may allow the database of the big data website to read the file C.

(3) An echo command provided by a CPU driver module may be invoked to disable the CPU core numbered 3 (that is, shield the CPU core numbered 3), and prohibit the CPU core numbered 3 from running.

According to the solution in this example, in the actual experiment, a fault of the CPU core can be accurately located by using an algorithm for locating a kernel system restart fault type. According to a verification effect of a sampled faulty device, an accuracy rate reaches over 95%, and the fault can be automatically located and accurately repaired without the need for pressure test and analysis.

According to the method for determining a faulty computing core in a multi-core processor provided in this embodiment of this application, when a plurality of running exceptions related to an exception that occurs when a computing core in the multi-core processor executes the program instructions occur on an electronic device, a computing core corresponding to the running exception may be analyzed. If computing cores corresponding to a preset quantity of running exceptions are a same computing core, it may be determined that the computing core is a faulty computing core. In this way, the faulty computing core is automatically and quickly determined without a professional or a special test.

Figure 4:
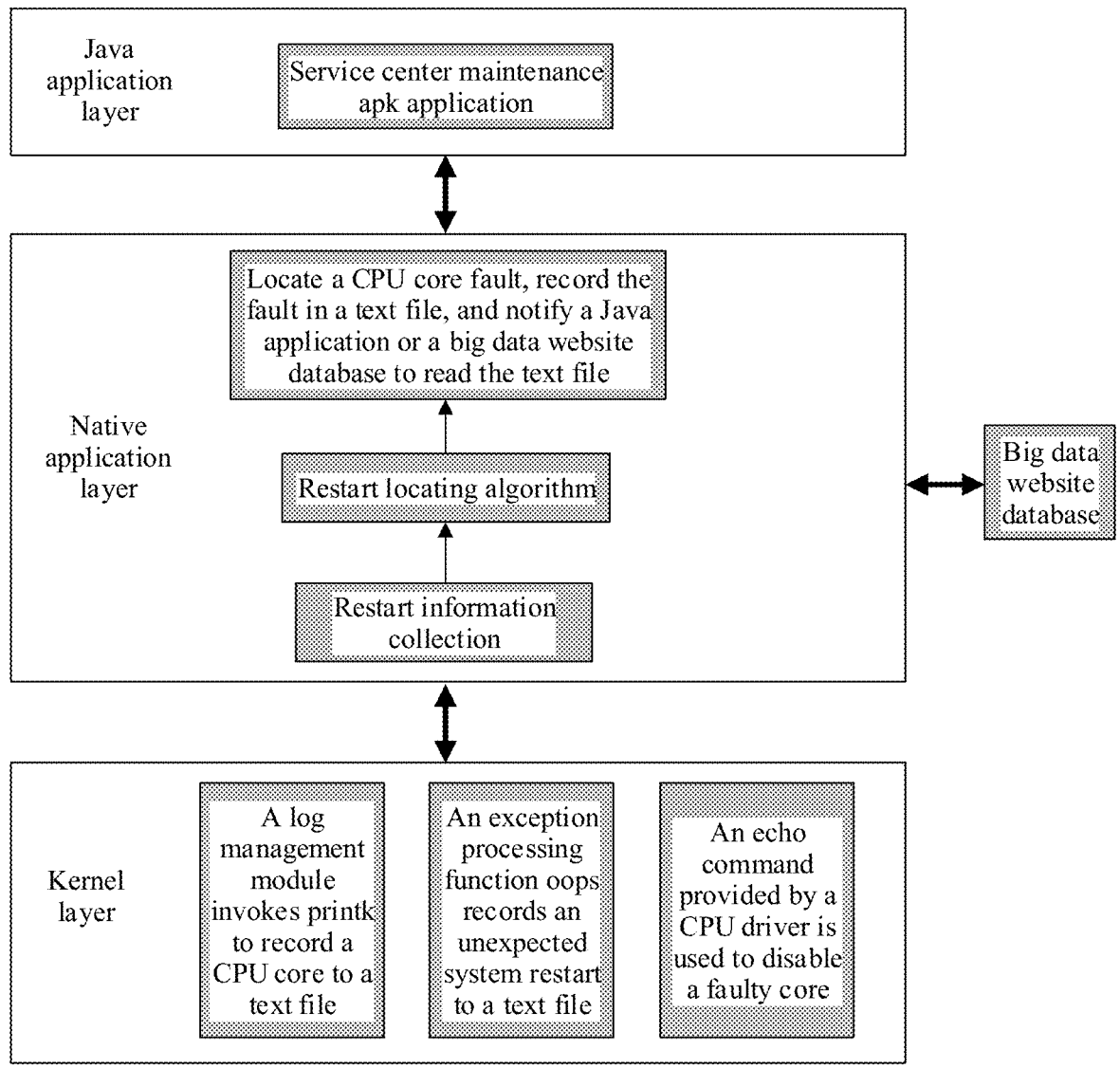
FIG. 4 is a conceptual block diagram of a method for determining a faulty computing core in a multi-core processor according to an embodiment of this application.

The following uses an example to describe, with reference to FIG. 4, in some embodiments, an implementation principle of the method for determining a faulty computing core in a multi-core processor according to an embodiment of this application.

As shown in FIG. 4, a software framework of an electronic device may include a Java application layer, a native application layer, and a kernel layer.

The Java application layer may include a Java application, such as a service center maintenance apk application.

The native application layer includes a native application. The native application may be written in C or C++. The native application can collect restart information, use a restart locating algorithm to locate that a restart is caused by a CPU core fault, record the information in a text file, and notify the Java application or a big data website database to read the information. Specifically, the native application reads a text file A and a text file B, collects a restart fault and corresponding CPU core information, locates the CPU core fault by using the restart locating algorithm of the native application, and records the fault in a text file C. Then, an echo command of a kernel CPU driver module is used to disable the faulty CPU core, so as to ensure stable user experience. Alternatively, the native application reports a CPU core fault result text file to a service center maintenance tool (namely, the service center maintenance apk application) to provide an accurate maintenance solution. Alternatively, the native application reports the CPU core fault result text file to a big data website for analysis and provides the file for R&D personnel to locate a reason.

The kernel layer may include a log management module, an exception processing function oops, a CPU driver, or the like.

In the solution of this embodiment, a key point lies in the restart locating algorithm, which associates a restart fault type with CPU core information by using an empirical value. Details are as follows:

(1) The kernel exception processing function oops records an unexpected system restart in the text file A, and the kernel log management module invokes a printk function to record the CPU core information in the text file B. A format of the text file A is shown in Table 1, and key information is reason and time. A format of the text file B is shown in Table 2, and key information is Time and Data.

(2) When software code of a device runs to a faulty CPU core, an exception occurs, data/an instruction address accessed by the software code is invalid, a kernel is triggered to invoke the oops function to record an unexpected restart event to the text file A, and then the kernel invokes a system restart process to actively restart the device. After a first unexpected system restart occurs, a native layer application reads the text file A, collects an unexpected restart event, records an occurrence time of the restart, and reads that a CPU core number recorded in the text file B 3.

(3) Step 2 is repeated until a third unexpected system restart occurs. Then, the native layer application calculates that an interval between the third unexpected restart and the first unexpected restart is within 7 days, and after the third unexpected restart occurs, if a CPU core number recorded in the text file B is 3, which is the same as that recorded in the previous two times, it is determined that a CPU 3 is faulty, a result is written into the text file C, and the Java application or the big data website database is notified to read the result.

(4) The echo command provided by the kernel CPU driver module is invoked to disable the CPU 3, and prohibit the CPU 3 from running.

It should be noted that there are the following prerequisites for locating a faulty CPU core to obtain a relatively accurate result:

(1) A kernel layer-based multi-core system load balancing scheduling algorithm, for example, a completely fair scheduler (CFS) can be used to avoid a case in which a process is permanently running on a CPU core.

(2) A system-on-a-chip (SOC) includes at least 8 CPU cores, so as to ensure that in a non-faulty case, a probability that a same core randomly presents for three consecutive times, that is, a false positive rate (quantity of CPU cores/quantity of CPU cores to the third power) is not greater than 8/512, in other words, 1.6%.

In the solution of this embodiment, a fault type such as a kernel system restart is collected, and the empirical value is associated with the CPU core information, so that the CPU core fault can be accurately located. According to the solution in this embodiment, automatic core disabling ensures stable user experience. In addition, the file recording the faulty CPU core can be provided for the service center maintenance tool for accurate maintenance, and the file recording the faulty CPU core can be reported to the big data website for R&D analysis.

An embodiment of this application provides a method for determining a faulty computing core in a multi-core processor. The method can be performed by a first electronic device. The first electronic device may be any apparatus, device, platform, or device cluster that has computing and processing capabilities. In an example, the first electronic device may be an electronic device located at an authorized maintenance site of a terminal such as a mobile phone. In another example, the first electronic device may be an electronic device of a manufacturer of a terminal such as a mobile phone. In another example, the first electronic device may be an electronic device that can be used by a user.

Figure 5:
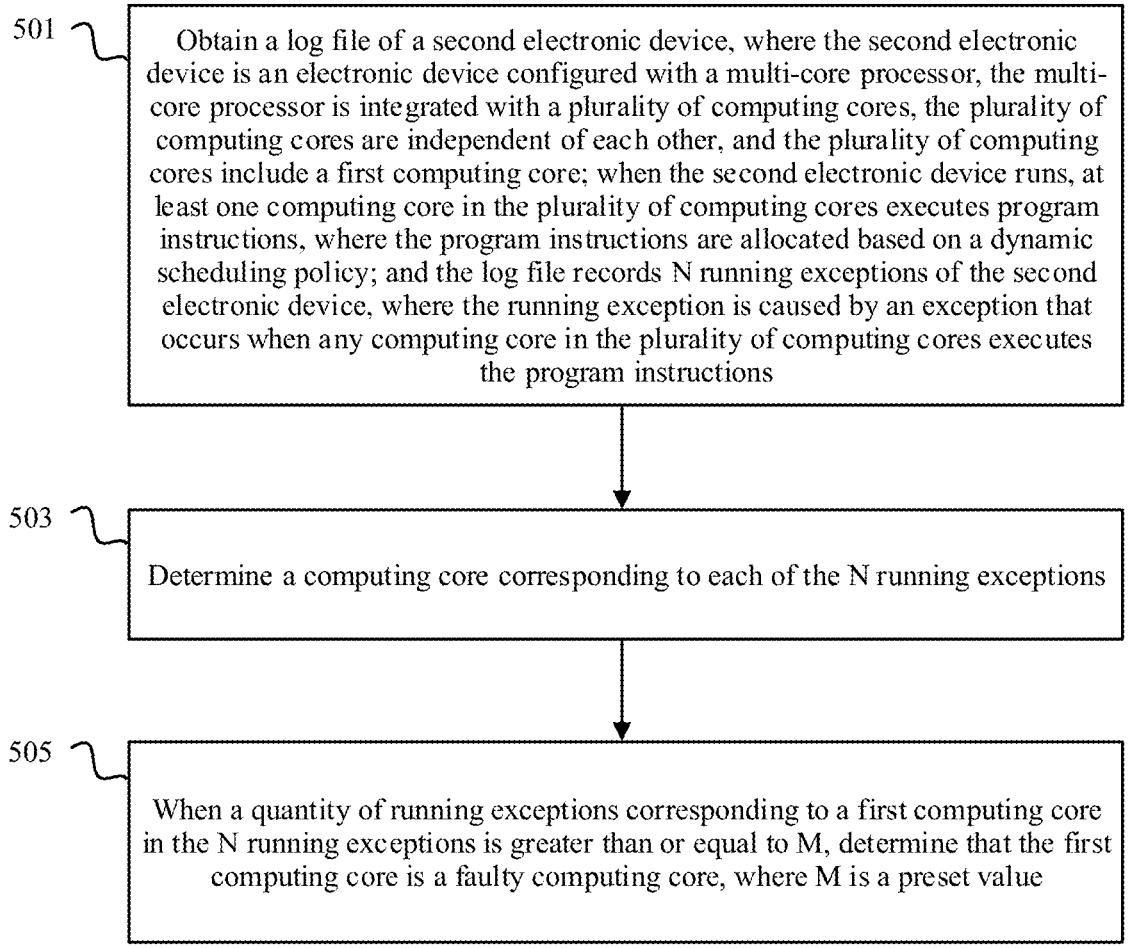
FIG. 5 is a flowchart of a method for determining a faulty computing core in a multi-core processor according to an embodiment of this application.

Refer to FIG. 5. The method includes the following steps.

Step 501: obtain a log file of a second electronic device, where the second electronic device is an electronic device configured with a multi-core processor, the multi-core processor is integrated with a plurality of computing cores, the plurality of computing cores are independent of each other, and the plurality of computing cores include a first computing core; when the second electronic device runs, at least one computing core in the plurality of computing cores executes program instructions, where the program instructions are allocated based on a dynamic scheduling policy; and the log file records N running exceptions of the second electronic device, where the running exception is caused by an exception that occurs when any computing core in the plurality of computing cores executes the program instructions.

For the second electronic device, refer to the description of the electronic device 100 shown in FIG. 1. For a manner of allocating the program instructions to the plurality of computing cores during running of the second electronic device, execution of the program instructions by the computing core, and the like, refer to the foregoing description of the embodiment shown in FIG. 3.

In some embodiments, before the first electronic device obtains the second electronic device, a network connection may be established, so that the second electronic device sends the log file to the first electronic device. For example, a connection is established by using Bluetooth or the like.

In some embodiments, before the first electronic device obtains the second electronic device, a connection may be established by using a data line, so that the second electronic device sends the log file to the first electronic device. For example, a connection is established by using a USB data line or the like.

In some embodiments, the first electronic device may be a server device corresponding to the second electronic device. For example, the first electronic device may be a device that is of a manufacturer of the second electronic device and that provides a cloud service for the second electronic device.

In some embodiments, the second electronic device may send the log file to the first electronic device.

In an illustrative example, the first electronic device may request authorization from the user, and send the log file to the second electronic device when obtaining the authorization from the user. Specifically, the electronic device may display authorization request information on a display. The authorization request information includes risk prompt information, a rejection function option, and a consent function option. After detecting that the user taps or touches the consent function option, the log file may be sent to another electronic device.

Step 503: determine a computing core corresponding to each of the N running exceptions.

For step 503, refer to the foregoing description of step 301, and details are not described herein again.

Step 505: when a quantity of running exceptions corresponding to the first computing core in the N running exceptions is greater than or equal to M, determine that the first computing core is a faulty computing core, where M is a preset value.

For step 505, refer to the foregoing description of step 303, and details are not described herein again.

In some embodiments, the multi-core processor is a central processing unit or a graphics processing unit.

In some embodiments, the dynamic scheduling policy is a completely fair scheduler.

In some embodiments, the running exceptions corresponding to the first computing core are consecutive running exceptions corresponding to the first computing core. For details, refer to the foregoing description of step 303, and details are not described herein again.

In some embodiments, the quantity of running exceptions corresponding to the first computing core is equal to N. For details, refer to the foregoing description of step 303, and details are not described herein again.

In some embodiments, the running exceptions corresponding to the first computing core are running exceptions corresponding to the first computing core that occur within preset duration. For details, refer to the foregoing description of step 303, and details are not described herein again.

In some embodiments, the method further includes: sending identification information of the first computing core to the second electronic device, so that the second electronic device shields the first computing core.

After determining the faulty computing core, the first electronic device may send identification information of the faulty computing core to the second electronic device. The second electronic device may identify the faulty computing core based on the identification information, and shield the faulty computing core. For details, refer to the foregoing description of step 303, and details are not described herein again.

In some embodiments, the running exception is an unexpected restart of the second electronic device.

In some embodiments, the log file includes a first file and a second file, the first file records an occurrence time and an occurrence reason of each of the N running exceptions, and the second file records an identifier of the computing core and an occurrence time of the running exception. For the first file and the second file, refer to the foregoing descriptions of the file A (or the file a) and the file B (or the file b).

The determining a computing core corresponding to each of the N running exceptions includes: determining the N running exceptions from the first file based on the occurrence reason of the running exception that is recorded in the first file; and determining, from the second file based on the occurrence time of the running exception recorded in the first file and the occurrence time of the running exception recorded in the second file, the computing core corresponding to each of the N running exceptions. For details, refer to the foregoing description of step 303, and details are not described herein again.

According to the method for determining a faulty computing core in a multi-core processor provided in this embodiment of this application, a log file of another electronic device may be obtained, and a faulty core of the another electronic device may be determined based on a running exception recorded in the log file. In this way, a faulty computing core is automatically and quickly determined without a professional or a special test.

An embodiment of this application provides an apparatus 600 for determining a faulty computing core in a multi-core processor. The apparatus 600 may be disposed in an electronic device configured with a multi-core processor, the multi-core processor is integrated with a plurality of computing cores, the plurality of computing cores are independent of each other, and the plurality of computing cores include a first computing core. When the electronic device runs, at least one computing core in the plurality of computing cores executes program instructions. The program instructions are allocated based on a dynamic scheduling policy.

Figure 6:
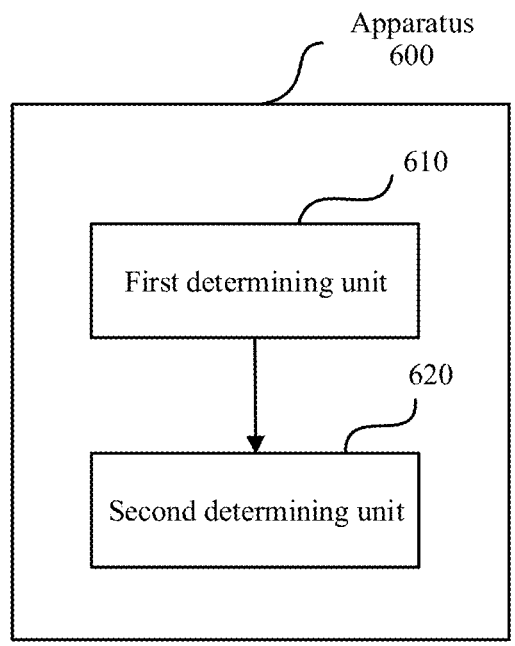
FIG. 6 is a schematic block diagram of an apparatus for determining a faulty computing core in a multi-core processor according to an embodiment of this application.

Refer to FIG. 6. The apparatus 600 includes:

a first determining unit 610, configured to determine a computing core corresponding to each of N running exceptions, where the running exception is caused by an exception that occurs when any computing core in the plurality of computing cores executes the program instructions; and a second determining unit 620, configured to: when a quantity of running exceptions corresponding to the first computing core in the N running exceptions is greater than or equal to M, determine that the first computing core is a faulty computing core, where M is a preset value.

The foregoing mainly describes the apparatus 600 provided in this embodiment of this application from a perspective of a method process. It can be understood that, to implement the foregoing functions, each electronic device includes a corresponding hardware structure and/or software module for implementing each function. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device may be divided into function modules according to the method embodiment shown in FIG. 3. For example, each function module may be obtained through division corresponding to each function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

According to the apparatus provided in this embodiment of this application, when a plurality of running exceptions related to an exception that occurs when a computing core in the multi-core processor executes the program instructions occur on an electronic device, a computing core corresponding to the running exception may be analyzed. If computing cores corresponding to a preset quantity of running exceptions are a same computing core, it may be determined that the computing core is a faulty computing core. In this way, the faulty computing core is automatically and quickly determined without a professional or a special test.

Figure 7:
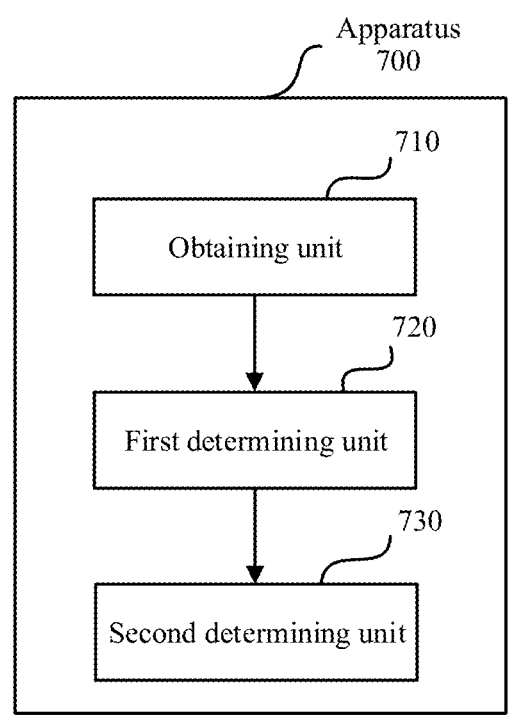
FIG. 7 is a schematic block diagram of an apparatus for determining a faulty computing core in a multi-core processor according to an embodiment of this application.

An embodiment of this application provides an apparatus 700 for determining a faulty computing core in a multi-core processor. The apparatus 700 may be disposed in a first electronic device. Refer to FIG. 7. The apparatus 700 includes:

an obtaining unit 710, configured to obtain a log file of a second electronic device, where the second electronic device is an electronic device configured with a multi-core processor, the multi-core processor is integrated with a plurality of computing cores, the plurality of computing cores are independent of each other, and the plurality of computing cores include a first computing core; when the second electronic device runs, at least one computing core in the plurality of computing cores executes program instructions, where the program instructions are allocated based on a dynamic scheduling policy; and the log file records N running exceptions of the second electronic device, where the running exception is caused by an exception that occurs when any computing core in the plurality of computing cores executes the program instructions;

a first determining unit 720, configured to determine a computing core corresponding to each of the N running exceptions; and a second determining unit 730, configured to: when a quantity of running exceptions corresponding to the first computing core in the N running exceptions is greater than or equal to M, determine that the first computing core is a faulty computing core, where M is a preset value.

The foregoing mainly describes the apparatus 700 provided in this embodiment of this application from a perspective of a method process. It can be understood that, to implement the foregoing functions, each electronic device includes a corresponding hardware structure and/or software module for implementing each function. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the electronic device may be divided into function modules according to the method embodiment shown in FIG. 5. For example, each function module may be obtained through division corresponding to each function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

According to the apparatus provided in this embodiment of this application, a log file of another electronic device may be obtained, and a faulty core of the another electronic device may be determined based on a running exception recorded in the log file. In this way, the faulty computing core is automatically and quickly determined without a professional or a special test.

Figure 8:
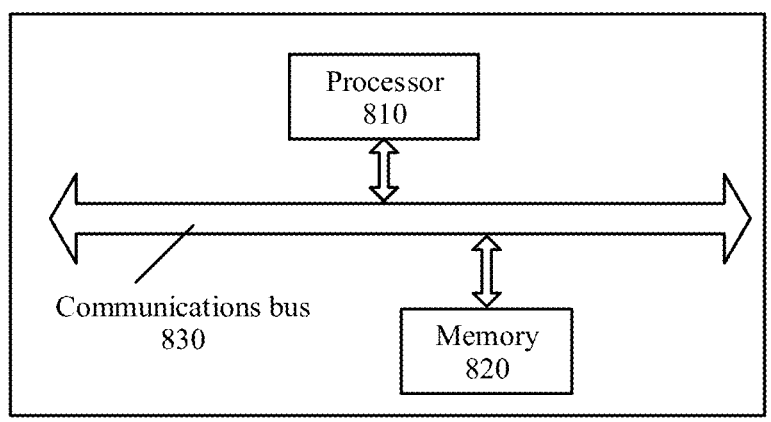
FIG. 8 is a schematic block diagram of an electronic device according to an embodiment of this application.

An embodiment of this application provides an electronic device. Refer to FIG. 8. The electronic device may include at least one processor 810 and a memory 820. The at least one processor 810 includes a multi-core processor. The multi-core processor is integrated with a plurality of computing cores, the plurality of computing cores are independent of each other, and the plurality of computing cores include a first computing core. When the electronic device runs, at least one computing core in the plurality of computing cores executes program instructions. The program instructions are allocated based on a dynamic scheduling policy.

The memory 820 is configured to store computer-executable instructions, and when the electronic device runs, the at least one processor 810 executes the computer-executable instructions stored in the memory 820, to enable the electronic device to perform the method shown in FIG. 3. The at least one processor 810 is configured to determine a computing core corresponding to each of N running exceptions. The running exception is caused by an exception that occurs when any computing core in the plurality of computing cores executes the program instructions. The at least one processor 810 is further configured to: when a quantity of running exceptions corresponding to the first computing core in the N running exceptions is greater than or equal to M, determine that the first computing core is a faulty computing core, where M is a preset value.

In some embodiments, the electronic device further includes a communications bus 830. The at least one processor 810 may communicate with the memory 820 through the communications bus 830, to obtain computer-executable instructions stored in the memory 820, and execute the computer-executable instructions.

For specific implementations of components/devices on the electronic device side in this embodiment of this application, refer to the foregoing method embodiment shown in FIG. 3. Details are not described herein again.

Therefore, when a plurality of running exceptions related to an exception that occurs when a computing core in the multi-core processor executes the program instructions occur on an electronic device, a computing core corresponding to the running exception may be analyzed. If computing cores corresponding to a preset quantity of running exceptions are a same computing core, it may be determined that the computing core is a faulty computing core. In this way, the faulty computing core is automatically and quickly determined without a professional or a special test.

Figure 9:
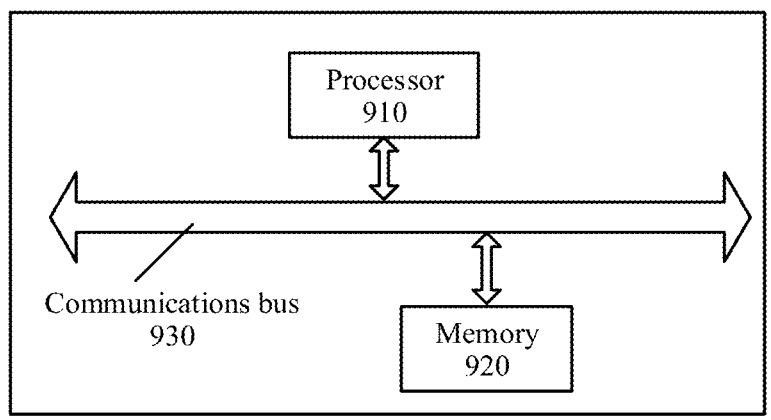
FIG. 9 is a schematic block diagram of an electronic device according to an embodiment of this application.

An embodiment of this application provides an electronic device. Refer to FIG. 9. The electronic device may include a processor 910 and a memory 920. The memory 920 is configured to store computer-executable instructions, and when the electronic device runs, the processor 910 executes the computer-executable instructions stored in the memory 920, to enable the electronic device to perform the method shown in FIG. 5. The processor 910 is configured to obtain a log file of a second electronic device. The second electronic device is an electronic device configured with a multi-core processor, the multi-core processor is integrated with a plurality of computing cores, the plurality of computing cores are independent of each other, and the plurality of computing cores include a first computing core. When the second electronic device runs, at least one computing core in the plurality of computing cores executes program instructions. The program instructions are allocated based on a dynamic scheduling policy. The log file records N running exceptions of the second electronic device. The running exception is caused by an exception that occurs when any computing core in the plurality of computing cores executes the program instructions. The processor 910 is further configured to determine a computing core corresponding to each of the N running exceptions. The processor 910 is further configured to: when a quantity of running exceptions corresponding to the first computing core in the N running exceptions is greater than or equal to M, determine that the first computing core is a faulty computing core, where M is a preset value.

In some embodiments, the electronic device further includes a communications bus 930. The processor 910 may communicate with the memory 920 through the communications bus 930, to obtain computer-executable instructions stored in the memory 920, and execute the computer-executable instructions.

For specific implementations of components/devices on the electronic device side in this embodiment of this application, refer to the foregoing method embodiment shown in FIG. 5. Details are not described herein again.

Therefore, a log file of another electronic device may be obtained, and a faulty core of the another electronic device may be determined based on a running exception recorded in the log file. In this way, the faulty computing core is automatically and quickly determined without a professional or a special test.

The method steps in the embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state drive, SSD)), or the like.

It may be understood that various numbers in the embodiments of this application are merely used for ease of distinguishing, and are not used to limit the scope of the embodiments of this application.

What is claimed is:

1. A method for determining a faulty computing core in a multi-core processor, applied to an electronic device configured with a multi-core processor, wherein the multi-core processor is integrated with a plurality of computing cores, the plurality of computing cores are independent of each other, and the plurality of computing cores comprise a first computing core; when the electronic device runs, at least one computing core in the plurality of computing cores executes program instructions, wherein the program instructions are allocated based on a dynamic scheduling policy; and the method comprises:

determining a computing core corresponding to each of N running exceptions, wherein the running exception is caused by an exception that occurs when any computing core in the plurality of computing cores executes the program instructions; and when a quantity of running exceptions corresponding to the first computing core in the N running exceptions is greater than or equal to M, determining that the first computing core is a faulty computing core, wherein M is a preset value.

2. The method according to claim 1, wherein the dynamic scheduling policy is a completely fair scheduler.

3. The method according to claim 1, wherein the quantity of running exceptions corresponding to the first computing core is equal to N.

4. The method according to claim 1, wherein the running exceptions corresponding to the first computing core are running exceptions corresponding to the first computing core that occur within preset duration.

5. The method according to claim 1, wherein the method further comprises: shielding the first computing core.

6. The method according to claim 1, wherein the running exception is an unexpected restart of the electronic device.

7. The method according to claim 1, wherein the electronic device comprises a first file and a second file, the first file records an occurrence time and an occurrence reason of each of the N running exceptions, and the second file records an identifier of the computing core and an occurrence time of the running exception; and the determining a computing core corresponding to each of N running exceptions comprises:

determining the N running exceptions from the first file based on the occurrence reason of the running exception that is recorded in the first file; and determining, from the second file based on the occurrence time of the running exception recorded in the first file and the occurrence time of the running exception recorded in the second file, the computing core corresponding to each of the N running exceptions.

8. The method according to claim 1, wherein information about the faulty computing core is recorded in a third file, and the third file may be invoked and/or sent to another electronic device.

9. A method for determining a faulty computing core in a multi-core processor, applied to a first electronic device; and the method comprises:

obtaining a log file of a second electronic device, wherein the second electronic device is an electronic device configured with a multi-core processor, the multi-core processor is integrated with a plurality of computing cores, the plurality of computing cores are independent of each other, and the plurality of computing cores comprise a first computing core; when the second electronic device runs, at least one computing core in the plurality of computing cores executes program instructions, wherein the program instructions are allocated based on a dynamic scheduling policy; and the log file records N running exceptions of the second electronic device, wherein the running exception is caused by an exception that occurs when any computing core in the plurality of computing cores executes the program instructions;

determining a computing core corresponding to each of the N running exceptions; and when a quantity of running exceptions corresponding to the first computing core in the N running exceptions is greater than or equal to M, determining that the first computing core is a faulty computing core, wherein M is a preset value.

10. The method according to claim 9, wherein the multi-core processor is a central processing unit or a graphics processing unit.

11. The method according to claim 9, wherein the dynamic scheduling policy is a completely fair scheduler.

12. The method according to claim 9, wherein the running exceptions corresponding to the first computing core are consecutive running exceptions corresponding to the first computing core.

13. The method according to claim 9, wherein the quantity of running exceptions corresponding to the first computing core is equal to N.

14. The method according to claim 9, wherein the running exceptions corresponding to the first computing core are running exceptions corresponding to the first computing core that occur within preset duration.

15. The method according to claim 9, wherein the method further comprises: sending identification information of the first computing core to the second electronic device, so that the second electronic device shields the first computing core.

16. The method according to claim 9, wherein the running exception is an unexpected restart of the second electronic device.

17. The method according to claim 9, wherein the log file comprises a first file and a second file, the first file records an occurrence time and an occurrence reason of each of the N running exceptions, and the second file records an identifier of the computing core and an occurrence time of the running exception; and the determining a computing core corresponding to each of the N running exceptions comprises:

determining the N running exceptions from the first file based on the occurrence reason of the running exception that is recorded in the first file; and determining, from the second file based on the occurrence time of the running exception recorded in the first file and the occurrence time of the running exception recorded in the second file, the computing core corresponding to each of the N running exceptions.

18. An apparatus for determining a faulty computing core in a multi-core processor, wherein the apparatus is disposed in an electronic device configured with a multi-core processor, the multi-core processor is integrated with a plurality of computing cores, the plurality of computing cores are independent of each other, and the plurality of computing cores comprise a first computing core; when the electronic device runs, at least one computing core in the plurality of computing cores executes program instructions, wherein the program instructions are allocated based on a dynamic scheduling policy; and the apparatus comprises:

a first determining unit, configured to determine a computing core corresponding to each of N running exceptions, wherein the running exception is caused by an exception that occurs when any computing core in the plurality of computing cores executes the program instructions; and a second determining unit, configured to: when a quantity of running exceptions corresponding to the first computing core in the N running exceptions is greater than or equal to M, determine that the first computing core is a faulty computing core, wherein M is a preset value.

19. An apparatus for determining a faulty computing core in a multi-core processor, wherein the apparatus is disposed in a first electronic device; and the apparatus comprises:

an obtaining unit, configured to obtain a log file of a second electronic device, wherein the second electronic device is an electronic device configured with a multi-core processor, the multi-core processor is integrated with a plurality of computing cores, the plurality of computing cores are independent of each other, and the plurality of computing cores comprise a first computing core; when the second electronic device runs, at least one computing core in the plurality of computing cores executes program instructions, wherein the program instructions are allocated based on a dynamic scheduling policy; and the log file records N running exceptions of the second electronic device, wherein the running exceptions are caused by an exception that occurs when any computing core in the plurality of computing cores executes the program instructions;

a first determining unit, configured to determine a computing core corresponding to each of the N running exceptions; and a second determining unit, configured to: when a quantity of running exceptions corresponding to the first computing core in the N running exceptions is greater than or equal to M, determine that the first computing core is a faulty computing core, wherein M is a preset value.

20. A computer storage medium, wherein the computer storage medium comprises computer instructions, and when the computer instructions are run on an electronic device, the electronic device is enabled to perform the method according to claim 1.

* * * * *

UNITED STATES PATENT AND TRADEMARK OFFICE
CERTIFICATE OF CORRECTION

PATENT NO. : 11,815,990 B2
APPLICATION NO. : 17/761683
DATED : November 14, 2023
INVENTOR(S) : Zhang et al.

It is certified that error appears in the above-identified patent and that said Letters Patent is hereby corrected as shown below:

In the Claims

Claim 18: Column 36, Line 51: "a first determining unit, configured to determine a com-" should read
-- a processor; and
a memory coupled to the processor and having computer-executable instructions stored thereon, which upon execution by the processor cause the apparatus to:
determine a com- --.

Claim 18: Column 36, Line 57: "a second determining unit, configured to: when a quantity" should read -- when a quantity --.

Claim 19: Column 36, Line 65: "an obtaining unit, configured to obtain a log file of a" should read
-- a processor; and
a memory coupled to the processor and having computer-executable instructions stored thereon, which upon execution by the processor cause the apparatus to:
obtain a log file of a --.

Claim 19: Column 37, Line 14: "a first determining unit, configured to determine a com-" should read -- determine a com- --.

Claim 19: Column 37, Line 17: "a second determining unit, configured to: when a quantity" should read -- when a quantity --.

Signed and Sealed this
Twenty-seventh Day of February, 2024

Katherine Kelly Vidal
*Director of the United States Patent and Trademark Office*